Patented May 11, 1937

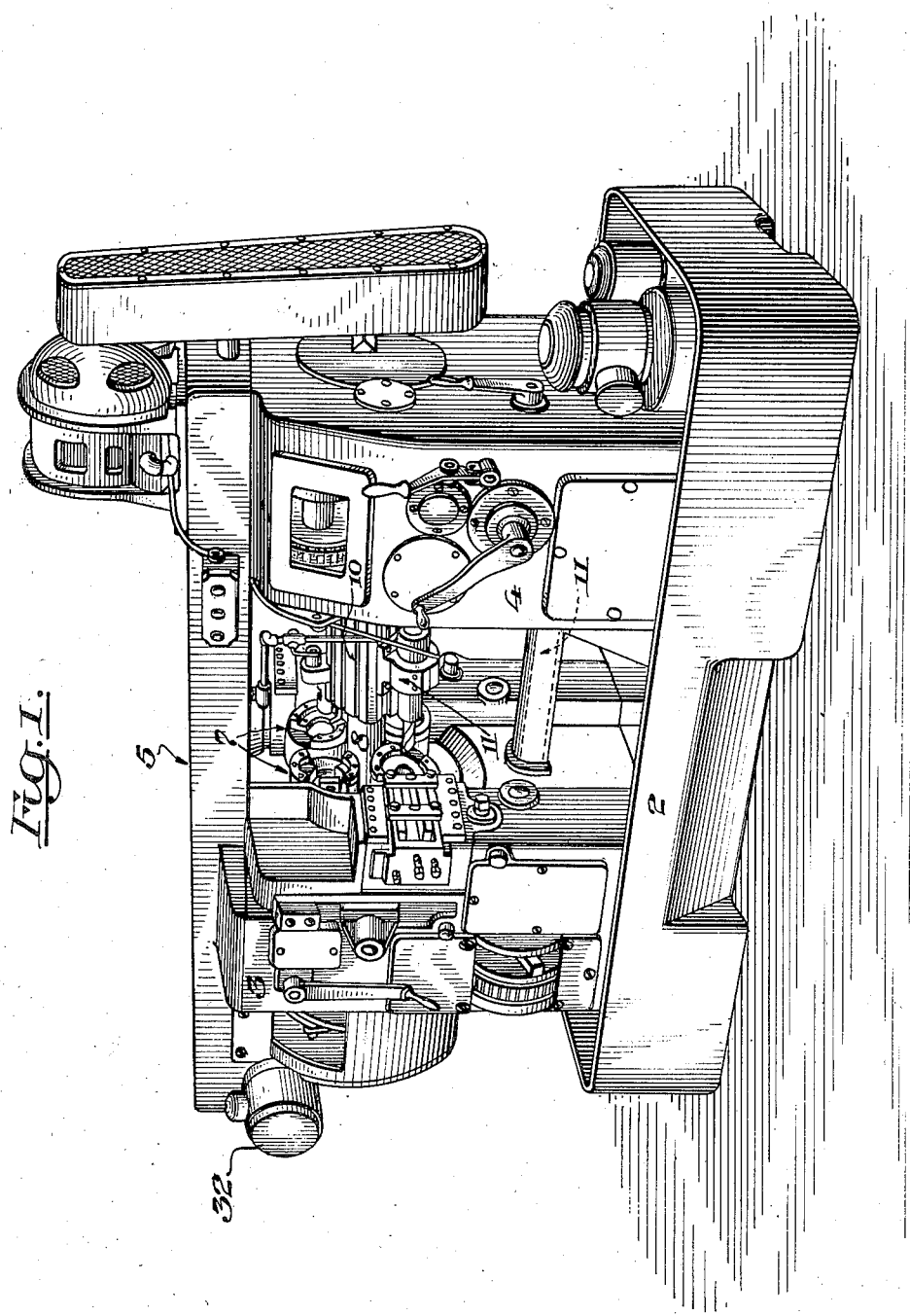

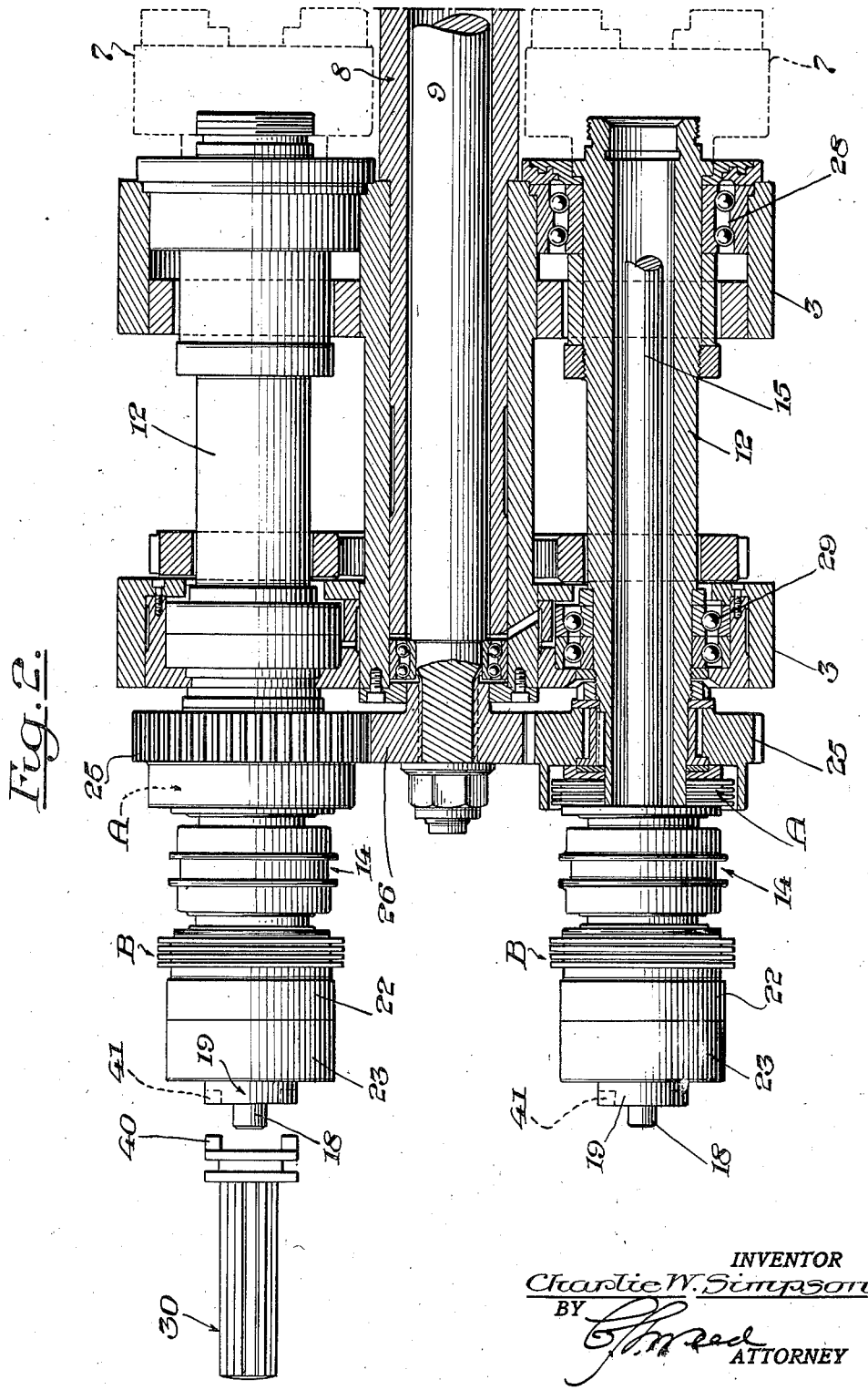

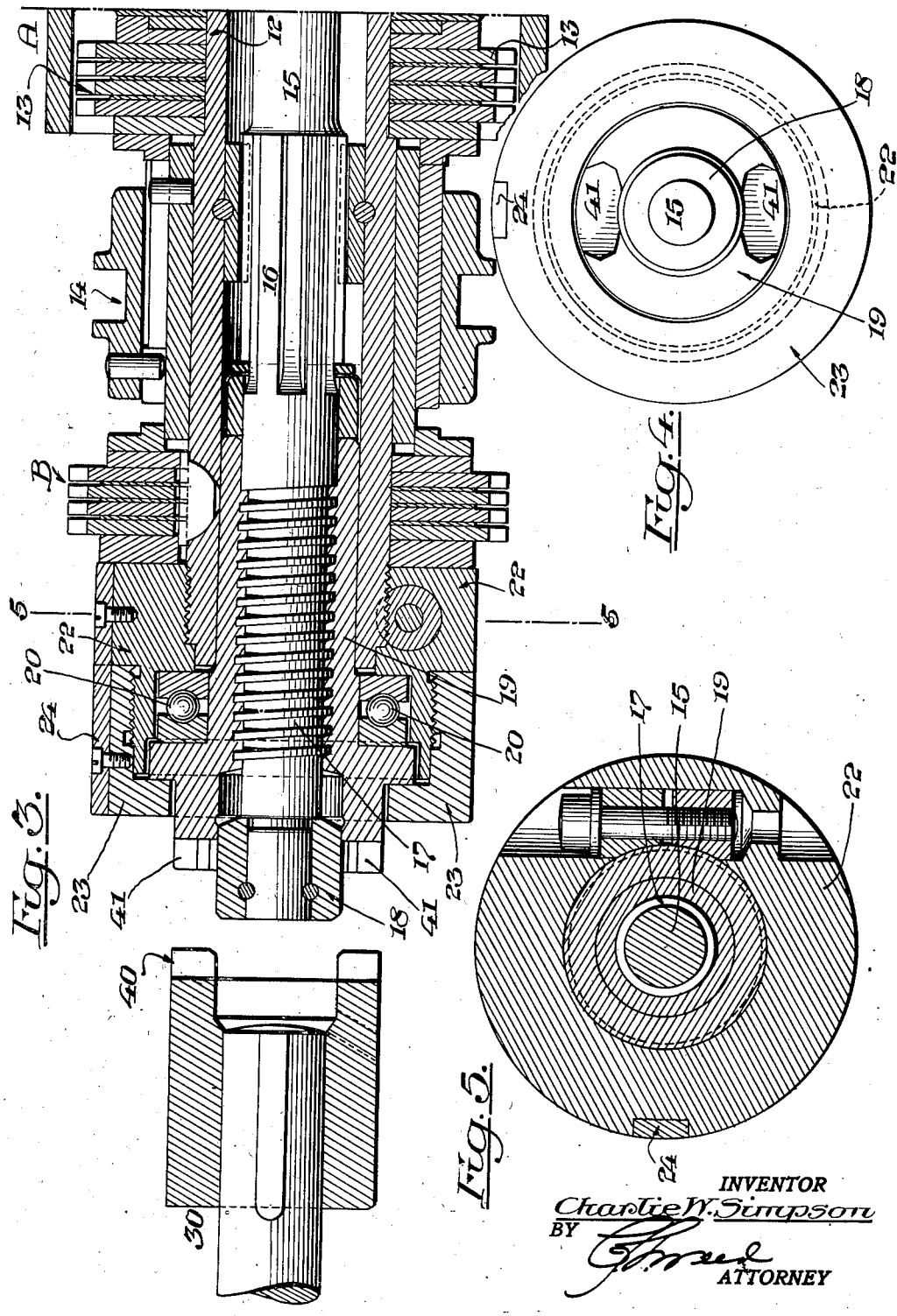

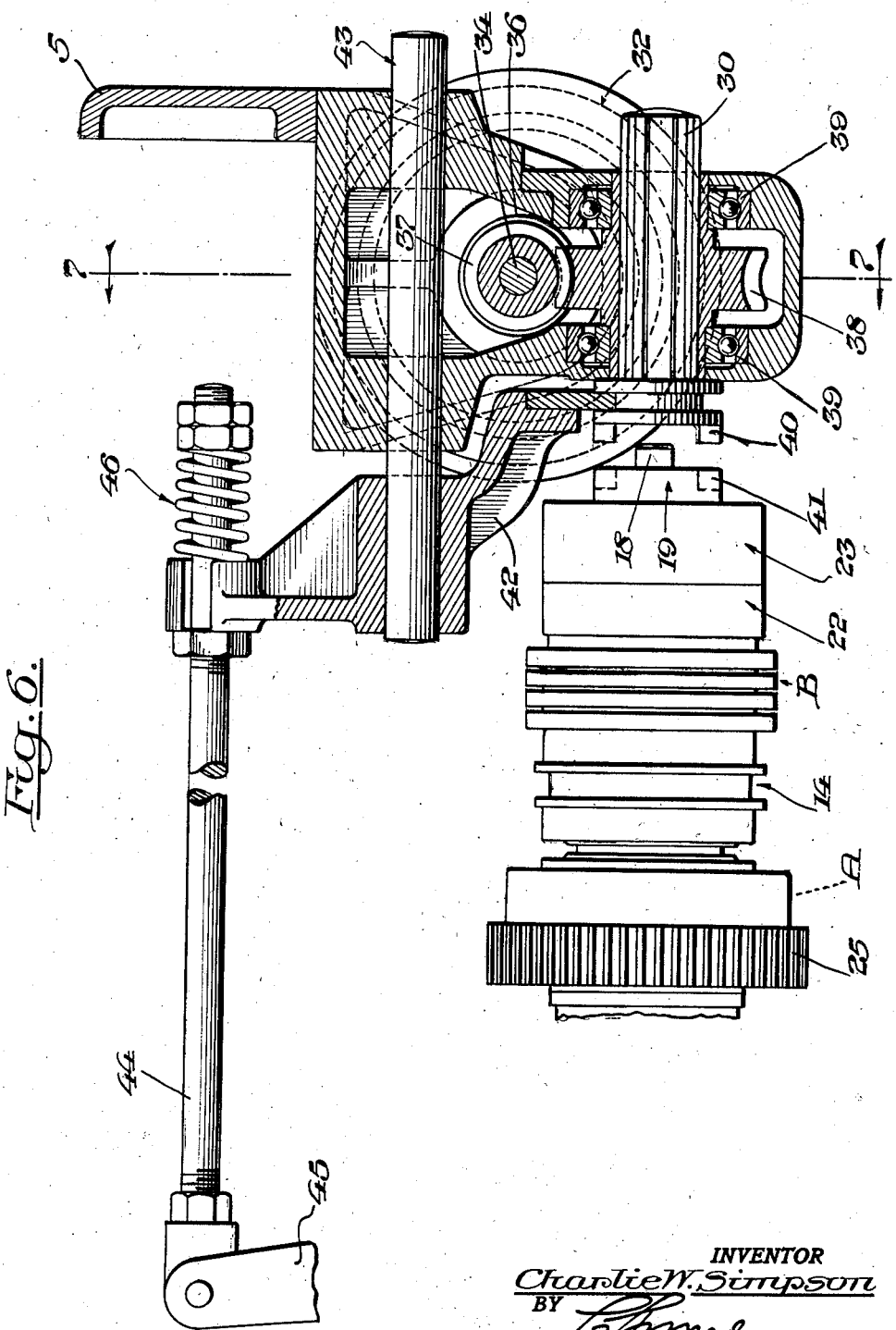

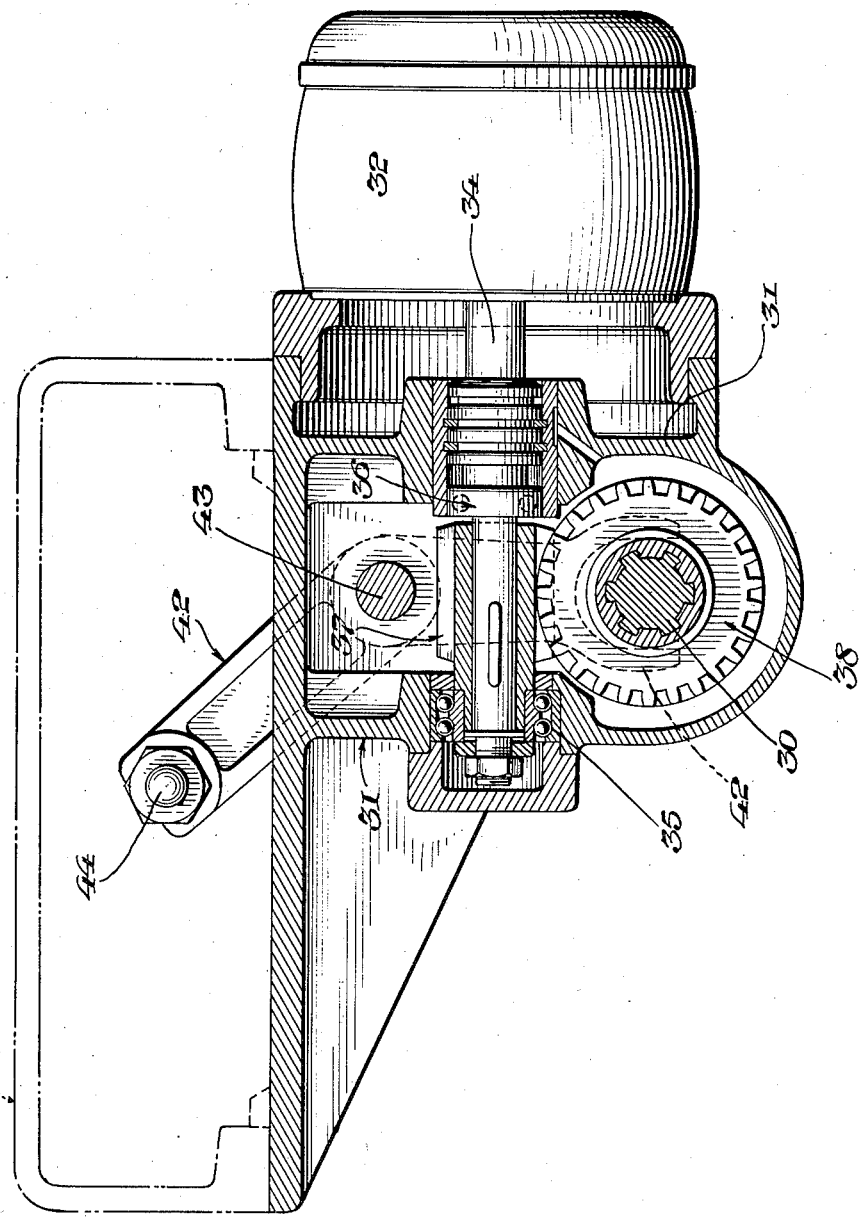

2,079,637

UNITED STATES PATENT OFFICE 2,079,637

ELECTRICAL CHUCKING MECHANISM FOR MULTIPLE SPINDLE AUTOMATIC CHUCKING MACHINES

Charlie W. Simpson, Cleveland, Ohio, assignor to National Acme Company, Cleveland, Ohio, a corporation of Ohio Application November 19, 1935, Serial No. 50,538

31 Claims. (Cl. 29—38)

This invention relates to automatic multiple spindle machines of that type known as automatic chucking machines having a sliding tool carrier and an indexible work spindle carrier having a plurality of rotatable work spindles provided with chucks for the reception of the rough forgings or castings to be operated upon by the tools carried by the tool slide, the object of the invention being to provide an improved electrically operated mechanism for opening and closing the chucks carried by the rotatable work spindles.

A further object of the invention is the provision of an improved electrically operated chucking mechanism utilizing a single electric motor fixed on the machine frame and automatically operatively connected with chuck operating means carried by each of the rotatable spindles as they are successively indexed into position.

Heretofore, in chucking machines, the rough forgings and castings have been chucked by means of air or hydraulic chucking means requiring fluid cylinders, air distributing stations and necessarily complicated valve mechanism and this mechanism had to be applied to the end of the spindle to make it possible to control the fluid through the valves located outside of the spindle carrier housing.

This mechanism was not only complicated but required considerable overhang to the work spindles making it necessary to construct the machines very much longer than was otherwise necessary, taking up considerable space and involving very complicated mechanism not always satisfactory in operation due to leakage and other causes, and attempts have been made to obviate these disadvantages by operating the chucks by means of electric motors, one of such machines of which I am aware, utilizing a plurality of electric motors, one for each chuck spindle and indexing the motors therewith.

Obviously, aside from the expense of providing, for instance, six motors in a six spindle machine, it was also quite a disadvantage to provide the indexible turret with heavy overhanging motors at the end thereof, necessitating the indexing of both the heavy motors and the turret. Therefore, to accomplish the operation of the chucks by a single motor supported independently of the indexible turret without the necessity of indexing a series of duplicate motors with the turret and thereby facilitating the rotation of the rotary chuck spindles is quite a step in advance of anything of which I am aware, especially as, in the present improvement, it is also practical to operate the chuck by a very much simplified chuck operating mechanism carried by the rotary work spindles.

I am also aware that it has been attempted to operate the chucks in a chucking machine by the use of a single motor, in which machine, however, rotatable tools are mounted in a fixed head while non-rotatable chucks are mounted in an indexible head but are not carried by work spindles rotatable within the head, the chucks being operated by mechanism located forward of the head and, therefore, are not operated by means carried within the rotary work spindles, such a machine necessitating that the motor operated means for opening and closing the chucks be located at the front of the head carrying the chucks and operate on chuck opening and closing means located transversely to and at the front of the chuck carrying head and which mechanism requires certain complicated features eliminated entirely in the present improved machine.

Therefore, one of the primary objects of the present improvement is to provide an automatic multiple spindle chucking machine of the horizontal type having an indexible work spindle carrier provided with rotatable chuck carrying spindles having therein suitable chuck operating means, each operative by a single motor when the chucks and their spindles are successively indexed into position, in combination with an axially supported sliding tool carrier carrying tools adapted to co-operate with the forgings or castings carried by the chucks and which mechanism is comparatively simple in construction and operation and effective to do the work desired and can be embodied in a comparatively small and practical machine, thus reducing the cost of manufacture and of operation.

In the drawings accompanying and forming a part of this specification, Fig. 1 is a perspective side view of this improved machine illustrating the compactness thereof.

Fig. 2 is a partly longitudinal sectional view of the indexible turret illustrating a plurality of chuck spindles carried thereby.

Fig. 3 is a longitudinal sectional view of one of the chuck spindles illustrating the means for opening and closing the chuck.

Fig. 4 is a rear end view of the spindle shown in Fig. 3.

Fig. 5 is a cross-sectional view taken on line 5—5 of Fig. 3.

Fig. 6 is a partly sectional view of the motor operated means for operating the chuck operating means, this view also illustrating the means adapted to be operated from the cam shaft for shifting the motor operated shaft to and from engagement with the chuck operating means within the rotary spindle, and Fig. 7 is a partly sectional view taken on line 7—7 of Fig. 6.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

In the preferred form thereof, the present chucking mechanism is embodied in a multiple spindle machine of which a general description is deemed sufficient and this comprises a bed 2, an upright housing 3 at one end and an upright housing 4 at the other end, these housings being connected by an overhead beam 5. The housing 3 supports the indexible chuck spindle carrier having suitable chucks 7.

On an axially located tube 8 carrying the driving shaft 9 for rotating the chuck spindles within the indexible carrier is an axially supported tool slide 10 for carrying the usual tool holders 11' to operate upon the castings or forgings carried by the chuck.

Within the housing 4 is the gear mechanism for the operation of certain parts of the machine.

Located below the main tool slide 10 is a cam shaft 11 by means of which the indexible carrier is indexed and located in the indexible carrier are a plurality of rotatable chuck carrying spindles 12, duplicates of each other and, therefore, a description of one is deemed sufficient for the purposes of this application.

Each of these rotatable spindles 12 has on its rear end a clutch 13 (see Fig. 3) of the common twin disk type for driving and stopping this spindle, these clutches being operated automatically by a sliding spool 14 at the proper time, and shiftable by a yoke from suitable mechanism. The disk clutch A controls the rotation of the spindle and the disk clutch B acts as a brake to hold the spindle in fixed position.

On the inside of the spindle is a draw rod 15 suitably connected at its forward end with the chuck jaws to open and close the same and it may be connected with a two, three or four jaw chuck or an adaptor or any suitable means necessary to hold the different types of work such as castings or forgings during the turning and boring operations. For this purpose the forward end of the drawbar has a threaded portion for engaging a threaded member connected to levers for shifting the chuck jaws and as this jaw operating means is common and well known, it is not deemed necessary to illustrate the same.

This draw rod is keyed or splined within the spindle to prevent its turning, as at 16, and is also provided with a thread 17 and has at its end a guide collar 18.

Between the draw rod and spindle is located a bronze nut 19 which turns freely inside the spindle 12. It is provided with a ball thrust bearing 20 to take the thrust, the nut 19 turning freely when driven by the sliding shaft connected with the electric motor hereinafter described.

Screwed on the end of the spindle and fastened thereto is a nut 22 and this controls the adjustment and alignment of the clutches 13 and this nut 22, together with a flanged nut 23 threaded on the nut 22 and securely held thereto by a key 24, holds the rotating nut 19 endwise within the spindle with sufficient clearance to allow the nut 19 to turn very freely.

Thus, obviously, by this simple mechanism, when the nut 19 is rotated, the draw bar 15 will be shifted back and forth within the rotatable chuck carrying spindle 12 to control the opening and closing of the chuck jaws.

For the purpose of rotating the chuck carrying spindles 12, supported by suitable bearings 28 and 29, each is provided with a gear 25 (see Fig. 2) in mesh with a gear 26 carried by the main driving shaft 9 located in the hollow tube 8 axially supporting the main tool slide 10, this driving shaft, of course, being supported by suitable bearings at its front and rear ends, respectively.

The rotation of the nut 19 is obtained by means of a rotating and sliding shaft 30 rotated by a single reversible motor in the manner about to be described.

A housing 31 for the electric driving unit including the motor 32 is bolted to the top beam 5, at the end of the machine, (see Fig. 7) a flanged type of motor being used in this instance, and the motor is controlled by suitable push buttons located conveniently near the chucking position so that the operator can use his left hand to operate the push buttons to chuck and unchuck the work and with his right hand take the work out of the chuck and place a rough piece in the chuck ready for operation.

The power used for chucking has been so designed that by means of power controllers, sixteen or more stations can be used to control the voltage for the motor. In other words, the chucking mechanism can be controlled with 100, 120, 140, 180, 200 and 220 volts, depending entirely upon the nature of the work. If it is a heavy forging, full power can be used. If the piece has a thin wall thickness and is liable to get crushed, the power can be reduced to the voltage desired.

The motor shaft 34 of the motor 32 extends through the housing 31 and is supported by suitable ball bearings 35 and 36. Between these sets of bearings, this motor shaft carries a worm 37 to drive a worm gear 38 and this worm gear 38 is suitably supported in the housing 31 by means of suitable ball bearings 39 (see Fig. 6) and this worm gear 38 has a splined hole therein to receive and drive the splined shaft 30 hereinbefore described and which is located in alignment with the spindle 12 when the spindle carrier is indexed to bring each chuck into chucking position and provided with lugs or projections 40 for engagement with similarly formed openings 41 in the end of the rotatable nut 19 that shifts the drawbar 15 backward and forward (see Fig. 6).

This shaft 30 is automatically shifted back and forth by a yoke 42 mounted on a shaft 43 by means of a rod 44 which is connected with the lever 45 extending into position to be operated by suitable cams mounted on a cam drum carried by the cam shaft 11, all of which mechanism is located preferably within the spindle carrier housing so that by this means the shaft 30 will be timely engaged and disengaged with the rotatable nut 19 and securely held out of engagement therewith during the indexing of the spindle carrier.

The rod 44 is provided with a spring 46 to insure safety in case the lugs 40 on the shaft 30 and the similarly formed openings 41 on the nut 19 should not engage properly. This spring maintains the operating yoke 42 which engages the splined shaft 30 under pressure until the motor is started so that the lugs 40 will engage with the openings 41 automatically and properly.

It is, of course, understood that all of the chuck spindles are rotating during the cutting operations but during the chucking operations which are done in one position only, the rotating spindles are stopped automatically to allow the operator to remove the finished work and replace it by a rough casting. Therefore, when the spindle carrier indexes and brings the loading spindle into position to chuck and unchuck the work and immediately after the indexing the clutches 13 are automatically operated to stop the rotation of the chuck spindle and brake the spindle to hold the spindle in a fixed position. When the brake engages automatically, the sliding shaft 30 operated by the motor is shifted forward towards the end of the work spindle and into engagement with the rotatable nut 19 and by using this improved means comprising a draw rod having a threaded portion and shifted by a rotatable nut of the simple character described, the chuck will always securely hold the work when the electric motor is disengaged, that is, when the shaft 30 is disengaged from the nut 19 without any other assisting means which was not the fact when air or hydraulic means was used for chucking because, in the latter constructions, the chuck only held the piece securely as long as there was pressure brought to the operating cylinders controlling the draw rod and the clamping device of the chucks.

In other words, if there was any leakage, the parts failed to operate properly.

The engaging lugs 40 of the motor operated shaft 30 and the similarly formed openings or lugs 41 of the rotating nut 19 are so constructed that there is sufficient play therebetween to give the motor a chance to start up before the lugs contact and this increases the torque of the motor or, to put it in another way, the construction is such that the nut 19 will be jarred loose.

From the foregoing, it will be seen that, in the present improvement, the chucking means is controlled by a single motor through a worm and worm gear and a sliding shaft driven by that worm gear and held in perfect alignment with the end of each working spindle as it is indexed into position but is adjustable so that it can be changed from one position to another when it is necessary to select another spindle for the chucking position.

As the motor drive of this chucking mechanism is mounted on a base or housing 31 fastened to the top beam 5 of the machine, it being illustrated in the present instance in position to operate the chucking mechanism in what is usually called the upper front or second position, if it is desired to use the chucking mechanism in the first position, all that is required is to change the cast iron bracket bolted to the top bracket to bring the motor in line with the 3rd position spindle using exactly the same driving unit.

On practically all automatic machines, the threading operations are performed in the upper positions so that the work has to be turned or bored first before the threading can be done and this is why, in a six spindle machine, it is arranged to chuck either in the 3rd, 4th or 5th positions.

From the foregoing, it will also be seen that, in the present improvement only a single motor is used driving a sliding shaft automatically controlled for engagement with a single rotary unit located inside of the work spindle for controlling the opening and closing of the chucks so that it will be noted that the chuck operating mechanism is very simple, free of complicated parts and quickly and readily operated to automatically control the operation of the chucks in an effective manner without any liability of the chuck jaws releasing the work when the motor shaft 30 is disengaged from the nut 19, and the simple mechanism shown and described permits the motor to be located transversely to the axes of the spindles and out of the way at the rear end of the machine so as not to interfere with the quick and expeditious loading and unloading of the chucks or the proper tooling of the machine and necessary attention thereto.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a horizontal type machine of the class described, the combination of a horizontally supported tool carrying means and a horizontally supported indexible work spindle carrier reciprocal relatively to each other, said carrier having a plurality of spindles, a chuck carried by each spindle, means within each spindle for operating its chuck, a single electric motor supported by the framework of the machine, and automatically shiftable direct driving means located exteriorly of the spindle and operated by the motor for axially directly engaging said chuck operating means within each spindle as it is successively indexed into position thereby to operate the chuck thereof.

2. In a horizontal type machine of the class described, the combination of a horizontally supported tool carrying means and a horizontally supported indexible work spindle carrier reciprocal relatively to each other, said carrier having a plurality of spindles, a chuck carried by each spindle, means within each spindle for operating its chuck, a single electric motor supported by the framework of the machine, and automatically shiftable means located exteriorly of the spindle and in alignment with the chuck operating means within the spindle and operated by the motor for directly engaging said chuck operating means within each spindle as it is successively indexed into position thereto to operate the chuck thereof.

3. In a horizontal type machine of the class described, the combination of a horizontally shiftable tool carrying slide and an indexible work spindle carrier having a plurality of rotatable spindles, a chuck carried by each rotatable spindle, means within each spindle for operating its chuck, a single electric motor supported by the framework of the machine, direct driving means located exteriorly of the spindle and operated by the motor for axially directly engaging the chuck operating means within each spindle as it is successively indexed into position thereby to operate the chuck thereof, and means automatically operative to engage and disengage the motor operating means with the chuck operating means at predetermined periods.

4. In a horizontal type machine of the class described, the combination of a horizontally shiftable tool carrying slide and an indexible work spindle carrier having a plurality of rotatable spindles, a chuck carried by each rotatable spindle, means within each spindle for operating its chuck, a single electric motor supported by the framework of the machine, direct driving means operated by the motor for directly engaging the chuck operating means within each spindle as it is successively indexed into position thereby to operate the chuck thereof, and means automatically operative to engage and disengage the motor operating means with the chuck operating means at predetermined periods and including a cam shaft.

5. In a horizontal type machine of the class described, the combination of a horizontally shiftable tool carrying slide, an indexible work spindle carrier having a plurality of rotatable spindles, a chuck carried by each spindle, a shiftable unit located within each work spindle for operating its chuck, a single electric motor fixed to the machine, a sliding and rotatable shaft in alignment with the shiftable unit within the spindle and driven by the motor for directly engaging and driving the shiftable unit within the spindle to open and close the chucks, and means thrown into operation by the machine at a predetermined time for shifting said sliding shaft.

6. In a horizontal type machine of the class described, the combination of a horizontally shiftable tool carrying slide, an indexible work spindle carrier having a plurality of rotatable spindles, a chuck carried by each spindle, a shiftable unit located within each work spindle for operating its chuck, a single electric motor fixed to the machine, a sliding and rotatable shaft in alignment with the shiftable unit within the spindle and driven by the motor for directly engaging and driving the shiftable unit within the spindle to open and close the chucks, and means automatically operative to slide said shaft into position to directly connect it to and disconnect it from the shiftable unit within the spindle.

7. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck, a single electric motor located at the rear end of the machine and transversely to the axes of the spindles, and direct driving means driven thereby for axially directly engaging and driving the shiftable unit within each spindle as it is successively indexed into position thereby to operate its chuck.

8. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck, a single electric motor located transversely to the axes of the spindles, and direct driving means driven thereby for directly engaging and driving the shiftable unit within each spindle as it is successively indexed into position thereby to operate its chuck and comprising a sliding and rotatable shaft located in alignment with the shiftable unit of each work spindle as it is indexed into position.

9. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck, a single electric motor fixed to the machine and adjustable relatively thereto, direct driving means driven thereby for axially directly engaging and driving the shiftable unit within the spindle to open and close the chucks as they are successively indexed into position, and means for automatically shifting said means at predetermined times.

10. In a horizontal type machine of the class described, the combination of a horizontally shiftable tool slide, an indexible work spindle carrier having a plurality of rotatable spindles, a chuck carried by each spindle, a shiftable unit located within each spindle for operating its chuck, a single electric motor fixed to the machine at the rear end thereof and located transversely to the axes of the spindles, a sliding and rotatable shaft driven thereby for axially directly engaging the shiftable unit within the spindle to open and close the chucks, and means for automatically shifting said shaft on the stoppage of the spindles.

11. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck, a single motor fixed to the machine and located transversely to the axes of the spindles, a slidable and rotatable shaft in alignment with the shiftable unit located within the spindle and driven by the motor for directly engaging and driving the shiftable unit to operate the chucks as they are successively indexed into position, and means for automatically shifting said shaft at predetermined times.

12. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck, a sliding and rotatable shaft in alignment with said unit, means thrown into operation by the machine at a predetermined time for shifting the shaft into and from direct engagement with said unit, means for rotating the shaft, and a single electric motor for operating said rotating means.

13. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck, a sliding and rotatable shaft in alignment with said unit, means for shifting the shaft into and from direct engagement with said unit, means for rotating the shaft and comprising worm gear mechanism, and a single electric motor for operating said rotating means.

14. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck and comprising a threaded draw bar, and rotatable threaded means for shifting said draw bar, a sliding and rotatable shaft in alignment with said draw bar and having means co-operating with the end of said rotatable means, means thrown into operation by the machine at a predetermined time for shifting said shaft after each indexing of the work spindle carrier into direct engagement with said rotatable means, and a single electric motor for rotating said shaft.

15. In a horizontal type machine of the class described, the combination of a horizontally shiftable tool slide, an indexible work spindle carrier having a plurality of rotatable spindles, a chuck carried by each spindle, a shiftable unit located within each work spindle for operating its chuck and comprising a threaded and shiftable draw bar, a rotatable member for shifting said draw bar, a rotatable and shiftable shaft in alignment with said draw bar and having means interlocking it with the rotatable member, automatically operative means for shifting said shaft toward and from direct engagement with the rotatable member, a worm gear splined on said shaft, and a single electric motor having a shaft provided with a worm co-operating with said worm gear.

16. In a horizontal type machine of the class described, the combination of an axially supported tool slide, an indexible work spindle carrier having a plurality of rotatable spindles, means for rotating and stopping the spindle, a chuck carried by each spindle, a shiftable unit located within each spindle for operating its chuck and comprising a draw bar held against rotation, rotatable means within the spindle for shifting said draw bar, a rotatable and sliding shaft in alignment with the draw bar and having means for interlocking it with the rear end of the draw bar rotatable means, a single electric motor for rotating said shaft, and means thrown into operation by the machine at a predetermined time for shifting said sliding shaft.

17. In a horizontal type machine of the class described, the combination of an axially supported tool slide, an indexible work spindle carrier having a plurality of rotatable spindles, means for rotating and stopping the spindle, a chuck carried by each spindle, a shiftable unit located within each spindle for operating its chuck and comprising a draw bar held against rotation, rotatable means within the spindle for shifting said draw bar, a rotatable and sliding shaft in alignment with the draw bar and having means for interlocking it with the draw bar rotatable means, a single electric motor for rotating said shaft, and means automatically operative to shift the shaft into and out of direct engagement with the draw bar rotatable means.

18. In a horizontal type machine of the class described, the combination of an axially supported tool slide, an indexible work spindle carrier having a plurality of rotatable spindles, clutch means for rotating the spindles, clutch means for braking the spindles on the stoppage thereof, a chuck carried by each spindle, a shiftable unit located within each spindle for operating its chuck and comprising a non-rotatable draw bar, rotatable means within the spindle for shifting said draw bar, a rotatable and slidable shaft in alignment with said rotatable means and having means for interlocking it therewith at the rear end thereof, a single electric motor, means between the motor and the slidable shaft for rotating it, and means thrown into operation by the machine at a predetermined time for shifting said sliding shaft.

19. In a horizontal type machine of the class described, the combination of an axially supported tool slide, an indexible work spindle carrier having a plurality of rotatable spindles, clutch means for rotating the spindles, clutch means for braking the spindles on the stoppage thereof, a chuck carried by each spindle, a shiftable unit located within each spindle for operating its chuck and comprising a non-rotatable draw bar, rotatable means within the spindle for shifting said draw bar, a rotatable and slidable shaft in alignment with said rotatable means and having means for interlocking it therewith, a single electric motor, means between the motor and the slidable shaft for rotating it, means thrown into operation by the machine at a predetermined time for shifting the shaft into and out of direct engagement with the draw bar rotatable means.

20. In a horizontal type machine of the class described, the combination of an axially supported tool slide, an indexible work spindle carrier having a plurality of rotatable spindles, clutch means for rotating the spindles, clutch means for braking the spindles on the stoppage thereof, a chuck carried by each spindle, a shiftable unit located within each spindle for operating its chuck and comprising a non-rotatable draw bar, rotatable means within the spindle for shifting said draw bar, a rotatable and slidable shaft in alignment with said rotatable means and having means for interlocking it therewith, a single electric motor, means between the motor and the slidable shaft for rotating it, a cam shaft, and means operated thereby for automatically shifting the slidable shaft into and out of direct engagement with the draw bar rotatable means on the indexing of the spindle carrier and on the stoppage of the rotating spindle to be chucked.

21. The combination with a chuck carrying spindle, of a splined and threaded draw bar located within said spindle for operating the jaws of a chuck, a rotatable member also within the spindle and having threads co-operating with the threads of the draw bar and having its end provided with interlocking projections, a shaft in alignment therewith and having co-operating locking projections for rotating said rotatable member thereby to shift the draw bar, means for rotating said shaft, and means thrown into operation by the machine at a predetermined time for shifting it into and out of direct engagement with said rotatable member.

22. The combination with a chuck carrying spindle, of a shiftable unit within the spindle for operating the jaws of a chuck and including a rotatable member within the spindle, a slidable shaft in alignment with said rotatable member and having with said rotatable member co-operating means for rotating said rotatable member, means thrown into operation by the machine at a predetermined time for shifting the shaft into and out of direct engagement with the rotatable member, and means for rotating said shaft.

23. The combination with a chuck carrying spindle, of a shiftable unit within the spindle for operating the jaws of a chuck and including a rotatable member within the spindle, a slidable shaft in alignment with said rotatable member and having with said rotatable member co-operating means for rotating said rotatable member, means thrown into operation by the machine at a predetermined time for shifting the shaft into and out of direct engagement with the rotatable member, and means for rotating said shaft and comprising a single electric motor located transversely thereto.

24. In a machine of the class described, the combination of tool carrying means and an indexible work spindle carrier reciprocal relative to each other, said carrier having a plurality of spindles, a chuck carried by each spindle, means within each spindle for operating its chuck, a single electrical motor supported by the framework of the machine, shiftable means operated by the motor for engaging said chuck operating means within each spindle as it is successively indexed into position thereby to operate the chuck thereof, a cam shaft for controlling certain mechanism of the machine, and means operated thereby for automatically shifting the shiftable means toward and from said chuck operating means within each spindle.

25. In a machine of the class described, the combination of tool carrying means and an indexible work spindle carrier reciprocal relative to each other, said carrier having a plurality of spindles, a chuck carried by each spindle, means within each spindle for operating its chuck, a single electric motor supported by the framework of the machine, shiftable means located in alignment with the chuck operating means within the spindle and operated by the motor for engaging said chuck operating means within each spindle as it is successively indexed into position thereby to operate the chuck thereof, a cam shaft for controlling certain mechanism of the machine, and means operated thereby for automatically shifting the shiftable means toward and from said chuck operating means within each spindle.

26. In a machine of the class described, the combination of a tool slide, an indexible work spindle carrier having a plurality of rotatable spindles, means for rotating the spindles, means for braking the spindles on the stoppage thereof, a chuck carried by each spindle, a shiftable unit located within each spindle for operating its chuck, a rotatable and slidable shaft in alignment with said unit as it is indexed into position and having means for interlocking it therewith, a single electric motor, means between the motor and slidable shaft for rotating it, a cam shaft, and means operated thereby for automatically shifting the slidable shaft into and out of engagement with said unit on the indexing of the spindle carrier and on the stoppage of the rotating spindle to be chucked.

27. In a machine of the class described, the combination of an axially supported tool slide, an indexible work spindle carrier having a plurality of rotatable spindles, means for rotating the spindles, means for braking the spindles on the stoppage thereof, a chuck carried by each spindle, a shiftable unit located within each spindle for operating its chuck and comprising a non-rotatable draw bar, rotatable means within the spindle for shifting said draw bar, a rotatable and sliding shaft in alignment with said rotatable means and having means for interlocking it therewith, a single electric motor, means between the motor and slidable shaft for rotating it, a cam shaft, and means operated thereby for automatically shifting the slidable shaft into and out of engagement with the draw bar rotatable means on the indexing of the spindle carrier and on the stoppage of the rotatable spindle to be chucked.

28. The combination with a chuck carrying spindle, of a shiftable unit within the spindle for operating the jaws of a chuck and comprising a sliding draw bar splined within the spindle to prevent rotation of said bar, rotatable means carried by said bar for sliding it, a splined sliding shaft co-operating with said rotatable means and in alignment with said sliding draw bar and forming a direct drive therefor, means thrown into operation by the machine at a predetermined time for shifting said shaft, and means for rotating said shaft and thereby the rotatable means to slide the draw bar back and forth.

29. The combination with a chuck carrying spindle, of a shiftable unit within the spindle for operating the jaws of a chuck and comprising a sliding draw bar splined within the spindle to prevent rotation of said bar, rotatable means carried by said bar for sliding it, a splined sliding shaft co-operating with said rotatable means and in alignment with said sliding draw bar and forming a direct drive therefor, means thrown into operation by the machine at a predetermined time for shifting said shaft, and means for rotating said shaft and thereby the rotatable means to slide the draw bar back and forth and comprising a single electric motor.

30. The combination with a chuck carrying spindle of a shiftable unit within the spindle for operating the jaws of a chuck and comprising a reciprocating draw bar within the spindle, rotatable means co-operating with the bar for reciprocating it, a direct driving reciprocating shaft in axial alignment with the draw bar and co-operating with said rotatable means for rotating it, a motor supported independently of said spindle for rotating said direct driving shaft, and means for automatically shifting the direct driving shaft toward and from direct engagement with the rotatable means.

31. The combination with a plurality of indexible chuck carrying spindles and means for indexing them, of a shiftable unit within each spindle for operating the jaws of a chuck and comprising a reciprocating draw bar within the spindle and rotatable means co-operating with the bar for reciprocating it, a direct driving reciprocating shaft in axial alignment with the draw bar and co-operating with said rotatable means for rotating it thereby to shift the draw bar and operate the chucks, a motor supported independently of the chuck carrying spindles, means between the motor and direct driving shaft for rotating it, the indexing of the chuck carrying spindles successively aligning a chuck carrying spindle with said direct driving shaft, and means for automatically shifting the direct driving shaft toward and from direct engagement with the rotatable means.

CHARLIE W. SIMPSON.

CERTIFICATE OF CORRECTION.

Patent No. 2,079,637.

May 11, 1937.

CHARLIE W. SIMPSON.

It is hereby certified that error appears in the printed specification of the above numbered patent requiring correction as follows: Page 4, first column, line 4-5, and line 20, first occurrence, claims 3 and 4 respectively, for the word "operating" read operated; same page, second column, line 68, claim 13, and page 5, first column, line 59, claim 17, before "means" insert a; page 6, second column, lines 43 and 58, claims 30 and 31 respectively, before "supported" insert stationarily; and that the said Letters Patent should be read with these corrections therein that the same may conform to the record of the case in the Patent Office.

Signed and sealed this 24th day of August. A. D. 1937.

Leslie Frazer

Acting Commissioner of Patents.

(Seal)